United States Patent [19]

Yung et al.

[11] Patent Number: 5,418,281

[45] Date of Patent: May 23, 1995

[54] BLENDS OF LIQUID CRYSTALLINE POLYMERS AND POLY(ARYLENE SULFIDE)S HAVING REDUCED VISCOSITIES

[75] Inventors: Paul C. Yung, Marlboro; H. Clay Linstid, III, Clinton, both of N.J.

[73] Assignee: Hoechst Celanese Corporation, Somerville, N.J.

[21] Appl. No.: 292,158

[22] Filed: Aug. 17, 1994

Related U.S. Application Data

[63] Continuation of Ser. No. 3,888, Jan. 13, 1993, abandoned.

[51] Int. Cl.$^6$ .................... C08K 3/40; C08L 67/04; C08L 77/12; C08L 81/02
[52] U.S. Cl. ..................... 524/602; 524/606; 524/607; 525/419; 525/425; 525/444; 525/450
[58] Field of Search ............... 525/419, 425, 444, 450; 524/602, 606, 607

[56] References Cited

U.S. PATENT DOCUMENTS

| 4,276,397 | 6/1981 | Froix | 525/448 |
| 4,567,227 | 1/1986 | Kiss | 524/538 |
| 5,006,402 | 4/1991 | Isayev | 525/437 |
| 5,151,458 | 9/1992 | Heinz et al. | 524/190 |

OTHER PUBLICATIONS

L. I. Minkova et al, *Polymer Engineering and Science*, "Crystallization Behavior of Polyphenylene Sulfide in Blends With a Liquid Crystalline Polymer", vol. 32 (No. 1), Mid–Jan., 1992, pp. 57–64.

S. M. Hong et al, *Polymer Journal*, "Crystallization Kinetics of Poly(phenylene sulfide) Containing a Thermotropic Liquid Crystalline Polyesteramide", vol. 24 (No. 8), 1992, pp. 727–736.

*Primary Examiner*—Melvyn I. Marquis
*Assistant Examiner*—D. R. Wilson
*Attorney, Agent, or Firm*—James L. McGinnis

[57] ABSTRACT

Blends of poly(arylene sulfide)s, liquid crystalline polyesters and liquid crystalline poly(esteramide)s exhibit a lower melt viscosity than would be expected based on the melt viscosities of analogous blends of liquid crystalline polyesters and poly(arylene sulfide)s that have the same overall amount of liquid crystalline polymer. The viscosities are reduced over a wide range of compositions. Such blends are useful in the manufacture of electronic components, particularly connectors.

17 Claims, No Drawings

BLENDS OF LIQUID CRYSTALLINE POLYMERS AND POLY(ARYLENE SULFIDE)S HAVING REDUCED VISCOSITIES

This is a Continuation of application(s) Ser. No. 08/003,888, filed on Jan. 13, 1993, now abandoned.

FIELD OF THE INVENTION

The invention relates generally to polymer blends, and more specifically, to blends of liquid crystalline polymers and poly(arylene sulfides).

BACKGROUND OF THE INVENTION

Polymers are often blended together and compounded with fillers to obtain a desired mix of properties for a particular application at an economic cost. In general, blends have properties that are approximately the average of the properties of the individual components. If severe phase separation occurs, the properties of the blend may be poorer than the average of the properties of the individual components. Only rarely are properties obtained that are better than the average of the properties of the components.

Blends of liquid crystalline polyesters and poly(arylene sulfide)s are known in the art, as described in U.S. Pat. No. 4,276,397. These blends have properties that make then useful in the electronics industry.

Blends of liquid crystalline poly(esteramides) and poly(phenylene sulfide)s have been reported in two publications, one by L. I. Minkova et al in *Polymer Engineering and Science*, Vol. 32 (No. 1), Mid-January, 1992, pp. 57–64, the other by S. M. Hong et al, *Polymer Journal*, vol. 24 (No. 8), 1992, pp. 727–736. The poly(phenylene sulfide) component of these blends shows an accelerated crystallization rate compared with unblended poly(phenylene sulfide).

Blends of wholly aromatic liquid crystalline polyesters and liquid crystalline poly(esteramides) have been reported in U.S. Pat. No. 4,567,227. Molded articles made from these blends are reported to show an improvement in certain physical properties compared with the average of the properties of the individual polymers. These blends are also reported as having a lower melt viscosity than that of either polymer component.

Finally, U.S. Pat. No. 5,15 1,458 discloses poly(arylene sulfide) molding compounds which have reduced melt viscosity and higher rates of crystallization through the addition of low molecular weight (i.e. non-polymeric) liquid crystal esters and/or esteramides.

SUMMARY OF THE INVENTION

It has now been found that blends comprising a liquid crystalline polyester, a liquid crystalline poly(esteramide) and a poly(arylene sulfide) have a lower melt viscosity than is expected based on the the melt viscosities of analogous blends of liquid crystalline polyesters and poly(arylene sulfides) having the same total content of liquid crystalline polymer. The amount of the liquid crystalline poly(esteramide) included in the polymeric composition can be chosen so that the melt viscosity of the composition is reduced by at least about 5% in comparison with the melt viscosity of the same blend where all of the liquid crystalline polymer is in the form of liquid crystalline polyester. A method is also disclosed for making blends of liquid crystalline polyesters and poly(arylene sulfides) having reduced melt viscosity by substituting a sufficient amount of liquid crystalline poly(esteramide) in place of a portion of the liquid crystalline polyester that the melt viscosity of the blend is reduced by at least about 5%.

DETAILED DESCRIPTION

Liquid crystalline polymers and liquid crystalline polyesters (referred to hereinafter respectively as "LCP's" and "LCP polyesters") are well known in the art. The polymer chains are relatively linear, so that the polymers melt to form a liquid crystalline phase. Such polymers are often referred to as thermotropic LCP's and thermotropic LCP polyesters. LCP polyesters are made by polymerizing aromatic diacids, diols and/or hydroxy acids having the formula:

X—Ar—Y where —X and —Y are alike or different and are selected from —OH, —COOH, and reactive derivatives of these that result in the formation of ester units during polymerization. In at least some of the monomer units in the above formula, and very often in all of the monomer units, Ar is one or more of 1,3-phenylene, 1,4-phenylene, 2,6-naphthylene, 2,7-naphthylene, and 4,4'-biphenylene, with 1,4-phenylene, 2,6-naphthylene, and 4,4'-biphenylene being preferred. Ar may optionally be substituted on the aromatic ring with one or more moieties selected from lower alkyl groups having 1 to 4 carbons, an aromatic group, F, Cl, Br and I. Aliphatic monomer units or partially aliphatic monomer units are also sometimes included in the polymers, as for example monomer units derived from ethylene glycol or stilbenedicarboxylic acid. The synthesis and structures of LCP polyesters are taught in numerous U.S. Pat. Nos. including, for example, 4,473,682; 4,522,974; 4,375,530; 4,318,841; 4,256,624; 4,161,470; 4,219,461; 4,083,829; 4,184,996; 4,279,803; 4,337,190; 4,355,134; 4,429,105; 4,393,191; and 4,421,908. LCP polyesters are available from Hoechst Celanese Corporation under the Vectra® trademark, as well as from other manufacturers under other names.

A particularly preferred LCP polyester comprises monomer repeat units selected from 4-hydroxybenzoic acid and 6-hydroxy-2-naphthoic acid, as taught in U.S. Pat. No. 4,161,470. In particularly preferred embodiments, monomer units derived from 4-hydroxybenzoic acid comprise about 70% to about 80% of the polymer and monomer units derived from 6-hydroxy-2-naphthoic acid comprise about 30% to about 20% of the polymer. In the most preferred embodiment, the LCP polyester comprises about 73% monomer units derived from 4-hydroxybenzoic acid and about 27% monomer units derived from 6-hydroxy-2-naphthoic acid. Another preferred LCP polyester comprises monomer units derived from 4-hydroxybenzoic acid, 6-hydroxy-2-naphthoic acid, terephthalic acid and 4,4'-biphenol, as taught in U.S. Pat. No. 4,473,682, with a particularly preferred LCP polyester comprising about 60% 4-hydroxybenzoic acid, about 4% 6-hydroxy-2-naphthoic acid, about 18% 4,4'-biphenol and about 18% terephthalic acid.

The LCP polyesters that are utilized in the current invention generally have a weight average molecular weight ($M_w$) greater than about 5000 and preferably greater than about 10,000. The preferred LCP polyester comprising monomer units derived from about 73% 4-hydroxybenzoic acid and 27% 6-hydroxy-2-naphthoic acid preferably has a molecular weight ($M_w$) greater than about 20,000 and often in the range of about 30,000 to about 40,000. Molecular weights in the low end of the above range (i.e., $M_w$ starting as low as about 5,000) may also be utilized in the current invention. To achieve such low molecular weights, the addition of a small amount of an end-tapping monomer unit or a slight imbalance in stoichiometry may be necessary. For example, a small amount of terephthalic acid may be included in polymers derived from 6-hydroxy-2-naphthoic acid and 4-hydroxybenzoic acid to reduce the molecular weight.

Liquid crystalline poly(esteramide)s, referred to hereinafter as "LCP poly(esteramide)s," are also well known in the art. They are generally made from the same monomer units as LCP polyesters, except that some or all of the hydroxyl groups in the monomers are replaced with amines. Thus, the monomer units of LCP poly(esteramide)s have the formula $$X-Ar'-Y$$

where —X and Y are alike or different and are each selected from —OH, —$NH_2$, —NHR, —COOH, and reactive derivatives thereof that result in the formation of ester and amide units during polymerization. In at least some of the monomer units in the above formula, and very often all of the monomer units, Ar' is one or more of 1,3-phenylene, 1,4-phenylene, 2,6-naphthylene, 2,7-naphthylene, and 4,4'-biphenylene, with 1,4-phenylene, 2,6-naphthylene and 4,4'-biphenylene being preferred. Ar' may optionally be substituted on the aromatic ring with one or more moieties selected from lower alkyl groups having 1–4 carbons, an aromatic group, F, Cl, Br and I. Aliphatic or partially aliphatic monomer units are also sometimes included in the polymer. The synthesis and structure of LCP poly(esteramide)s are taught in several. U.S. Pat. Nos. including, for example, 4,339,375; 4,355,132; 4,351,917; 4,330,457; and 4,35 1,918.

A particularly preferred LCP poly(esteramide) comprises monomer units derived from 6-hydroxy-2-naphthoic acid, terephthalic acid and 4-aminophenol, as taught in U.S. Pat. No. 4,330,457, with the LCP poly(esteramide) derived from about 60% 6-hydroxy-2-naphthoic acid, about 20% terephthalic acid and about 20% 4-aminophenol being most preferred. Another preferred LCP poly(esteramide) is derived from 4-hydroxybenzoic acid, 6-hydroxy-2-naphthoic acid, 4,4'-biphenol, terephthalic acid and 4-aminophenol, with the LCP poly(esteramide) derived from about 60% 4-hydroxybenzoic acid, about 3.5% 6-hydroxy-2-naphthoic acid, about 13.25% 4,4'-biphenol, about 18.25% terephthalic acid and about 5% 4-aminophenol being particularly preferred.

The LCP poly(esteramide)s utilized in the current invention generally have a weight average molecular weight ($M_w$) of at least about 5,000, and preferably greater than about 10,000. The particularly preferred poly(esteramide) comprising monomer units derived from about 60% 6-hydroxy-2-naphthoic acid, about 20% terephthalic acid and about 20% 4-aminophenol typically has a molecular weight of about 20,000. LCP poly(esteramide)s having molecular weights in the low end of the above range (i.e., $M_w$ starting as low as about 5,000) may also be utilized in the current invention. To achieve these lower molecular weights, it may be necessary to include an end-capping monomer in the polymer or to maintain a slight stoichiometric imbalance of monomer reactants.

Poly(arylene sulfide)s are also well known in the art. They are polymers comprising monomer units having the formula $$-Ar''-S-$$

where Ar'' is one or more disubstituted aromatic moieties. Examples of poly(arylene sulfide)s include polymers in which Ar'' is 1,4-phenylene, 1,3-phenylene, 4,4'-biphenylene, 2,4-tolylene, 2,5-tolylene, 1,4-naphthylene, 2,6-naphthylene, 1-methoxy-2,5-phenylene, and the like. Some trisubstituted aromatic units Ar'' may also be included, in which case the polymer is branched. Some of the aromatic units Ar'' may also be substituted with lower alkyl groups having 1–4 carbons, phenyl, F, Cl, Br, I, or lower alkoxy groups having 1–4 carbons as, for example, methoxy. The preferred poly(arylene sulfide) is poly(phenylene sulfide), in which case Ar'' is 1,4-phenylene.

There is extensive literature on poly(arylene sulfide)s and poly(phenylene sulfide) and on methods for making them. See, for example, an article entitled "Poly(arylene sulfide)s" in "Encyclopedia of Polymer Science and Engineering", Second Edition, H. F. Mark et al., ed., John Wiley and Sons, New York, 1988, Vol. 11, pp. 531–557. The preferred poly(phenylene sulfide) is described in U.S. Pat. No. 4,645,826. It is made by the condensation of an alkali metal sulfide and 1,4-dichlorobenzene in a solvent. Poly(phenylene sulfide) as taught therein can be made in a range of molecular weights by adjusting the temperature, solvents, time of reaction and other conditions. Poly(phenylene sulfide) resins having melt viscosities in the range of about 200 to about 2000 poise at 310° C. and 1200 $sec^{-1}$ are particularly useful. Poly(phenylene sulfide) resins and compounds are available from a number of manufacturers and suppliers, including Hoechst Celanese Corporation under the Forton ® trademark, Phillips Petroleum Company under the Ryton ® trademark, GE Plastics under the Supec ® trademark and Mobay Corp. under the Tedur ®trademark.

Other additives may also be included in the compositions of the current invention, such as lubricants, mold release agents, antioxidants, stabilizers, colorants, impact modifiers, solid fillers (including reinforcing fillers) and the like. These are all well known in the art. Examples of solid fillers/reinforcing fillers include carbon, carbon fibers, wollastonite, mica, talc, silicates, silica, clays, poly(tetrafluoroethylene), alumina, alumina fiber, glass, glass fiber, tungsten fiber, cotton, wool, rock wool, steel fiber, silicon carbide and the like. Glass fiber is a particularly preferred solid filler/reinforcing filler. Such glass fiber may be pre-treated with a sizing agent as, for example, a silane coupling agent.

Blends of LCP polyester, LCP poly(esteramide) and poly(arylene sulfide) exhibit a melt viscosity that is lower than the melt viscosity of a corresponding blend of LCP polyester and poly(arylene sulfide), where the total amount of LCP compared with poly(arylene sulfide) is the same in both blends. In other words, the melt viscosity of a blend of LCP polyester and poly(arylene sulfide) is generally reduced when LCP poly(esteramide) is substituted for a portion of the LCP polyester, so that the melt viscosity of the 3-component blend that has the same relative amounts of total LCP and poly(arylene sulfide) as the blend of LCP polyester and poly(arylene sulfide) has a melt viscosity that is reduced by at least about 5%. The reduction of the melt viscosity of LCP polyester/poly(arylene sulfide) blends by addition of LCP poly(esteramide) is particularly surprising in view of the fact that LCP poly(esteramide)s generally have a higher melt viscosity than the LCP polyesters. It is especially surprising that the effect can be observed with even a very small amount of LCP poly(esteramide). Thus, in Example 1, a 20% reduction in melt viscosity was achieved when only 0.33% LCP poly(esteramide) was substituted for 0.33% LCP polyester in a blend of 33% LCP polyester and 67% poly(phenylene sulfide). Furthermore, viscosity reductions of about 5-15% were observed even when other additives were included in the blend, such as solid fillers, as for example, glass fiber.

For the preferred embodiments, it appears that a reduction in viscosity of at least about 5% is achieved as long as the total LCP comprises at least about 10% of the polymer blend. In particularly preferred embodiments, the compositions comprise about 20% to about 80% LCP and about 80% to about 20% poly(arylene sulfide), with the LCP poly(esteramide) comprising about 0.5% to about 50% of the total LCP. The reduction in viscosity is observed for the filled compositions as well. Preferred compositions include about 90 to about 10 parts by weight of the LCP polyester and poly(esteramide), about 10 to about 90 pans by weight of poly(arylene sulfide) and up to about 300 parts by weight of inorganic filler.

The blends and compounds are made using methods well-known in the art. The preferred method of blending is melt blending, in which the LCP polyester, poly(arylene sulfide) and a viscosity-reducing amount of LCP poly(esteramide) are mixed in the molten phase in an extruder, as for example, a twin screw extruder. If an inorganic filler, such as glass, is also included, it is preferably added in a later mixing zone after the polymers are mixed to minimize crushing or fragmentation of the filler. The polymers are preferably dried before mixing by heating them in a dry atmosphere for several hours.

The compositions taught herein are useful in the manufacture of molded pans by injection molding. They are particularly useful in the manufacture of electronic connectors. The reduction in melt viscosity that results from the addition of LCP poly(esteramide) is advantageous in the molding of intricate parts with small cavities that are difficult to fill during molding with polymers having higher viscosity.

The following examples provide a more detailed description of the preferred embodiments of the current invention.

EXAMPLES 1-14

A large number of blends and compounds were made utilizing the materials described below. The LCP polyester used in these examples (referred to as "LCP-ester" in the examples) is a copolymer of about 73 mole % 4-hydroxybenzoic acid and 27 mole % 6-hydroxy-2-naphthoic acid. A typical sample has a molecular weight $M_w$ of about 36,000. The LCP poly(esteramide) (referred to as "LCP-esteramide") is a copolymer of about 60 mole % 6-hydroxy-2-naphthoic acid, 20 mole % terephthalic acid and 20 mole % 4-aminophenol. A typical sample has a molecular weight $M_w$ of about 22,000. Two different molecular weights of polyphenylene sulfide (PPS) were utilized. Both are linear PPS resins made by the condensation of sodium sulfide and p-dichlorobenzene by methods well known in the art. The lower and higher molecular weight PPS resins are referred to as "Lo-PPS" and "Hi-PPS" respectively in the examples.

The melt viscosities of each of the four polymers varied somewhat, but in general were approximately as follows:

LCP-ester, 550-700 poise at 300° C. and 1000 $sec^{-1}$;

LCP-esteramide, 1200-2200 poise at 300° C. and 1000 $sec^{-1}$;

Lo-PPS, about 250-330 poise at 310° C. and 1200 $sec^{-1}$; and

Hi-PPS, about 550 poise at 310° C. and 1200 $sec^{-1}$.

In general, LCP-esteramide has the highest melt viscosity of the four polymers. Hi-PPS has a higher melt viscosity than Lo-PPS. Lo-PPS and LCP-ester are roughly comparable in viscosity at high shear. The melt viscosities of the PPS resins and LCP-esteramide are relatively insensitive to shear. The melt viscosity of LCP-ester is sensitive to shear, becoming considerably less viscous at high shear. Glass fiber was also included in some of the blending experiments. The glass fiber had been pre-treated with a silane coupling agent.

Prior to melt blending or compounding, the polymer samples were mixed by tumbling in pellet or powder form in the desired ratio and then dried overnight at about 150° C. The dried polymers were then melt blended in a 28 mm or 30 mm ZSK twin screw extruder at a screw speed of 300 rpm with a barrel profile of about 290°-310° C. Any glass that was included in the compositions was added downstream from the blending zone.

Viscosity measurements were carried out on a Kayeness Capillary Viscometer using a 0.8 inch by 0.04 inch I.D. capillary. These measurements were generally carried out at 300° C. at shear rates varying from 100 $sec^{-1}$ to 1000 $sec^{-1}$.

Melt viscosity data are presented in Tables 1-4. Table 1 illustrates the data obtained in blends of LCP-ester, LCP-esteramide and the lower viscosity PPS (Lo-PPS). The compositions of Table 1 all contain 33% LCP, but with varying amounts of LCP-ester and LCP-esteramide. Table 2 summarizes data in the form of paired comparisons in which the viscosities of blends of LCP-ester and Lo-PPS are compared with the viscosities of blends in which a portion of LCP-ester has been replaced with LCP-esteramide, so that the total amount of LCP remains constant in each experiment. Table 3 provides comparative viscosity data for compounds of LCP-ester, LCP-esteramide, Lo-PPS and glass fiber. Finally, Table 4 presents data on blends of Hi-PPS and LCP; these data are also in the form of paired experiments in which the viscosities of blends of Hi-PPS and LCP-ester are compared with the viscosities of blends in which a portion of LCP-ester has been replaced with LCP-esteramide, so that the total amount of LCP remains constant in each experiment. Table 4 also includes data in which glass fiber is part of the composition.

The data in Tables 1-4 generally indicate that even small amounts of LCP-esteramide can have a large effect on the melt viscosities. Thus, in Example 1, the presence of 0.33% LCP-esteramide is sufficient to reduce the melt viscosity of a composition using Lo-PPS by 20%. It can be seen that all of the blends in Table 1 that contain all three polymers have a lower melt viscosity than the blend of Lo-PPS with either LCP-ester or LCP-esteramide. All of the blends in Table 1 contain 33% LCP.

With the exception of Examples 5 and 13, where the LCP content of the composition was 10% or less, and Example 9, where a small amount of LCP-esteramide was blended with LCP-ester and Hi-PPS, the viscosity-reducing effect of adding LCP-esteramide is quite general. This is true for both higher and lower molecular weight variants of PPS, and for compositions with or without glass.

EXAMPLE 15

The compounded product of Example 10, comprising 19% LCP-ester, 1% LCP-esteramide, 40% Hi-PPS and 40% glass fiber was injection molded on a Boy 30M molding machine to produce test bars for the measurement of physical properties. The comparative material of Example 10, comprising 20% LCP-ester, 40% Hi-PPS and 40% glass fiber, but no LCP-esteramide was also made into test bars. The measured properties are shown in Table 5. It is apparent from the data in Table 5 that the presence or absence of LCP-esteramide does not make a significant difference in the physical properties.

It is to be understood that the above-described embodiments are illustrative only and that modification throughout may occur to one skilled in the art. Accordingly, this invention is not to be regarded as limited to the embodiments disclosed herein but is to be defined only by the appended claims.

TABLE 1

Blends of LCP-ester, LCP-esteramide and Lo-PPS

| Composition-wt. %[1] | Comparison[2] | Example 1 | Example 2 | Example 3 | Example 4 |
|---|---|---|---|---|---|
| LCP-ester | 33.0 | 32.7 | 31.35 | 28.0 | 23.0 |
| LCP-esteramide | — | 0.33 | 1.65 | 5.0 | 10.0 |
| Lo-PPS | 67.0 | 67.0 | 67.0 | 67.0 | 67.0 |
| Melt Viscosity, poise, 300° C., 1000 sec$^{-1}$ | 457 | 365 | 377 | 356 | 368 |
| % change with LCP-esteramide | — | −20% | −18% | −22% | −19% |

[1]Blended on 28 mm ZSK twin screw extruder at melt temperature of 300° C.–310° C.
[2]A blend of 33.0% LCP-esteramide and 67.0% Lo-PPS had a melt viscosity of 592 poise at 300° C. and 1000 sec$^{-1}$

TABLE 2

Blends of LCP-ester, LCP-esteramide and Lo-PPS

| | Example 5 | | Example 6 | | Example 7 | | Example 8 | |
|---|---|---|---|---|---|---|---|---|
| Composition-wt. %[1] | Comparison | Example | Comparison | Example | Comparison | Example | Comparison | Example |
| LCP-ester | 5.0 | 3.35 | 50 | 48.35 | 70 | 68.35 | 95 | 93.35 |
| LCP-esteramide | — | 1.65 | — | 1.65 | — | 1.65 | — | 1.65 |
| Lo-PPS | 95 | 95 | 50 | 50 | 30 | 30 | 5 | 5.0 |
| Melt Viscosity, 300° C., 1000 sec$^{-1}$ | 302 | 308 | 394 | 344 | 381 | 309 | 515 | 463 |
| % Change with LCP-esteramide | — | 0[2] | — | −13% | — | −19% | — | −10% |

[1]Blended on 28 mm ZSK twin screw extruder at melt temperature of 290–310° C.
[2]No significant change

TABLE 3

Compound of LCP-ester, LCP-esteramide, Lo-PPS and Glass Fiber

| Composition-wt. %[1] | Comparison | Example 14 |
|---|---|---|
| LCP-ester | 20 | 19 |
| LCP-esteramide | — | 1 |
| Lo-PPS | 40 | 40 |
| Glass Fiber[2] | 40 | 40 |
| Melt Viscosity, 300° C. (Poise) | | |
| 1000 sec$^{-1}$ | 761 | 689 |
| 100 sec$^{-1}$ | 1078 | 981 |
| % Change in melt viscosity | | |
| 1000 sec$^{-1}$ | — | −9% |
| 100 sec$^{-1}$ | — | −9% |

[1]Data are based on the average of two compounding experiments
[2]Sized with a silane coupling agent

TABLE 4

Blends of LCP-ester, LCP-esteramide and Hi-PPS

| | Example 9 | | Example 10 | | Example 11[3] | | Example 12 | | Example 13 | |
|---|---|---|---|---|---|---|---|---|---|---|
| Composition-wt %[1] | Comparison | Example | Comparison | Example | Comparison | Example | Comparison | Example | Comparison | Example |
| LCP-ester | 33.0 | 31.35 | 20 | 19 | 20 | 19 | 15 | 14 | 10 | 9 |
| LCP-esteramide | — | 1.65 | — | 1 | — | 1 | — | 1 | — | 1 |
| Hi-PPS | 67.0 | 67.0 | 40 | 40 | 40 | 40 | 45 | 45 | 50 | 50 |
| Glass Fiber[2] | — | — | 40 | 40 | 40 | 40 | 40 | 40 | 40 | 40 |
| Melt Viscosity at 300° C. | | | | | | | | | | |
| 1000 sec$^{-1}$ | 593 | 591 | 1059 | 966 | 1043 | 906 | 1212 | 1153 | 1337 | 1363 |
| 400 sec$^{-1}$ | — | — | 1574 | 1438 | — | — | 1805 | 1718 | 1966 | 1953 |
| 100 sec$^{-1}$ | — | — | 2900 | 2500 | 2874 | 2438 | 3148 | 3025 | 3172 | 3198 |
| % change in melt viscosity | | | | | | | | | | |
| 1000 sec$^{-1}$ | — | 0[4] | — | −9% | — | −13% | — | −5% | — | 0[4] |
| 400 sec$^{-1}$ | — | — | — | −9% | — | — | — | −5% | — | 0 |

TABLE 4-continued

Blends of LCP-ester, LCP-esteramide and Hi-PPS

| Composition-wt %[1] | Example 9 Comparison | Example 9 Example | Example 10 Comparison | Example 10 Example | Example 11[3] Comparison | Example 11[3] Example | Example 12 Comparison | Example 12 Example | Example 13 Comparison | Example 13 Example |
|---|---|---|---|---|---|---|---|---|---|---|
| 100 sec$^{-1}$ | — | — | — | −14% | — | −15% | — | −4% | — | 0 |

[1]Compounded on 30 mm ZSK twin screw extruder, barrel profile 290°–310°; screw speed 300 rpm, except Example 10, where screw speed was 400 rpm
[2]Fiberglass sized with a silane coupling agent
[3]Average of 3 compounding experiments
[4]No significant change

TABLE 5

Comparison of Physical Properties

| Composition-wt. %[1] | Control | Example |
|---|---|---|
| LCP-ester | 20 | 19 |
| LCP-esteramide | — | 1 |
| Hi-PPS | 40 | 40 |
| Glass Fiber | 40 | 40 |
| Tensile Strength, kpsi[2] | 25.0 | 26.1 |
| Tensile Modulus, kkpsi[2] | 2.47 | 2.48 |
| Elongation, %[2] | 1.4 | 1.4 |
| Flexural Strength, kpsi[3] | 36.8 | 36.7 |
| Flexural Modulus, kkpsi[3] | 2.38 | 2.37 |
| Notched Izod, ft-lb/in[4] | 1.69 | 1.69 |
| HDT at 246 psi, °C.[5] | 262° C. | 262° C. |

[1]Same samples as Example 10, injection molded on a Boy 30M molding machine
[2]ASTM D-638
[3]ASTM D-790
[4]ASTM D-256
[5]ASTM D-648

We claim:

1. A polymeric composition comprising an aromatic thermotropic liquid crystalline polyester having a weight average molecular weight ($M_w$) of at least about 5000, an aromatic thermotropic liquid crystalline poly(esteramide) having a weight average molecular weight ($M_w$) of at least about 5000, and a poly(arylene sulfide), said poly(arylene sulfide) having a melt viscosity of from about 200 to about 2000 poise at 310° C. and 1200 sec$^{-1}$, wherein the liquid crystalline polyester and liquid crystalline poly(esteramide) combined comprise at least about 20% of the total weight of the liquid crystalline polyester, the liquid crystalline poly(esteramide) and the poly(arylene sulfide) components combined, and wherein the liquid crystalline poly(esteramide) comprises from about 1 to about 30% by weight of the combined weight of the liquid crystalline polyester and liquid crystalline poly(esteramide) components with the proviso that the liquid crystalline polyester and liquid crystalline poly(esteramide) components combined comprise at least 15% by weight of the total weight of the composition.

2. The polymeric composition recited in claim 1 wherein the melt viscosity of the composition at 300° C. and 1000 sec$^{-1}$ is at least 5% lower than that of an otherwise identical composition having an equal amount of liquid crystal polymer all of which is present as the liquid crystalline polyester.

3. The polymeric composition recited in claim 1, wherein the liquid crystalline polyester and liquid crystalline poly(esteramide) combined comprise from about 20 to about 80% by weight of the total weight of the liquid crystalline polyester, the liquid crystalline poly(esteramide) and the poly(arylene sulfide) components thereof combined, and the poly(arylene sulfide) comprises from about 80 to about 20% by weight of the total weight of the liquid crystalline polyester, the liquid crystalline poly(esteramide) and the poly(arylene sulfide) components thereof combined, and wherein said liquid crystalline poly(esteramide) is present in an amount sufficient to reduce the melt viscosity of the composition at 300° C. and 1000 sec$^{-1}$ by at least 4. The polymeric composition recited in claim 1, wherein said liquid crystalline polyester comprises monomer units derived from one or more aromatic monomers having the formula

X—Ar—Y where X and Y are alike or different and are each selected from —OH and —COOH, and where Ar is an aromatic nucleus selected from 1,4-phenylene, 1,3-phenylene, 2,6-naphthylene, 2,7-naphthylene, 4,4'-biphenylene, and mixtures thereof, wherein Ar may optionally be substituted with one or more moieties selected from lower alkyl groups having 1 to 4 carbons, an aromatic group, F, Cl, Br and I.

5. The polymeric composition recited in claim 1, wherein said liquid crystalline polyester comprises aromatic monomer units derived from 6-hydroxy-2-naphthoic acid and 4-hydroxybenzoic acid.

6. The polymeric composition recited in claim 1, wherein said liquid crystalline polyester comprises aromatic monomer units derived from 6-hydroxy-2-naphthoic acid, 4-hydroxybenzoic acid, terephthalic acid, and 4,4'-biphenol.

7. The polymeric composition recited in claim 1, wherein said liquid crystalline poly(esteramide) comprises monomer units derived from one or more aromatic monomers having the formula

X—Ar'—Y wherein X and Y are alike or different and are each selected from —OH, —NH$_2$, —NHR, and —COOH, wherein R is a lower alkyl group having 1–4 carbon atoms, and Ar' is selected from 1,4-phenylene, 1,3-phenylene, 2,6-naphthylene, 2,7-naphthylene, 4,4'-biphenylene, and mixtures thereof, and wherein Ar' may be substituted with one or more moieties selected from lower alkyl groups having 1 to 4 carbon atoms, an aromatic group, F, Cl, Br and I.

8. The polymeric composition recited in claim 1, wherein said liquid crystalline poly(esteramide) comprises aromatic monomer units derived from 6-hydroxy-2-naphthoic acid, terephthalic acid and 4-aminophenol.

9. The polymeric composition recited in claim 1, wherein said liquid crystalline poly(esteramide) comprises aromatic monomer units derived from 4-hydroxybenzoic acid, 6-hydroxy-2-naphthoic acid, 4,4'-biphenol, terephthalic acid and 4-aminophenol.

10. The polymeric composition recited in claim 1, wherein said poly(arylene sulfide) is poly(phenylene sulfide).

11. A polymeric composition comprising (a) an aromatic thermotropic liquid crystalline polyester having a weight average molecular weight ($M_w$) of at least about 5000, said liquid crystalline polyester consisting essentially of monomer repeat units derived from 4-hydroxybenzoic acid and 6-hydroxy-2-naphthoic acid; (b) an aromatic thermotropic liquid crystalline poly(esteramide) having a weight average molecular weight ($M_w$) of at least about 5000, said liquid crystalline poly(esteramide) consisting essentially of monomer repeat units derived from terephthalic acid, 4-aminophenol and 6-hydroxy-2-naphthoic acid; and (c) poly(phenylene sulfide), said poly(phenylene sulfide) having a melt viscosity of from about 200 to about 2000 poise at 310° C. and 1200 sec$^{-1}$, wherein a sufficient amount of said liquid crystalline poly(esteramide) has been substituted for an equal amount of said liquid crystalline polyester to reduce the melt viscosity of the composition at 300° C. and 1000 se$^{-1}$ by at least about 10%.

12. The polymeric composition recited in claim 11, comprising at least about 10% by weight, based on the total weight of components (a), (b) and (c), of a mixture of said liquid crystalline polyester and said liquid crystalline poly(esteramide).

13. The polymeric composition recited in claim 11, comprising about 20 to about 80% by weight, based on the total weight of components (a), (b) and (c), of a mixture of said liquid crystalline polyester and said liquid crystalline poly(esteramide) and about 80 to about 20% by weight, based on the total weight of components (a), (b) and (c), of said poly(phenylene sulfide), said liquid crystalline poly(esteramide) comprising about 1 to about 15% by weight of said mixture of said liquid crystalline polyester and said liquid crystalline poly(esteramide).

14. A filled polymeric composition comprising an aromatic thermotropic liquid crystalline polyester having a weight average molecular weight ($M_w$) of at least about 5000, an aromatic thermotropic liquid crystalline poly(esteramide) having a weight average molecular weight ($M_w$) of at least about 5000, a poly(arylene sulfide), said poly(arylene sulfide) having a melt viscosity of from about 200 to about 2000 poise at 310° C. and 1200 sec$^{-1}$, and a solid filler, wherein a sufficient amount of said liquid crystalline poly(esteramide) has been substituted for an equal amount of said liquid crystalline polyester to reduce the melt viscosity of the composition at 300° C. and 1000 sec$^{-1}$ by at least about 10%.

15. The filled polymeric composition recited in claim 14, comprising about 20 to about 80 parts by weight, based on the total weight of the liquid crystalline polyester, the liquid crystalline poly(esteramide) and the poly(arylene sulfide) components thereof, of poly(arylene sulfide), about 80 to about 20 parts by weight, based on the total weight of the liquid crystalline polyester, the liquid crystalline poly(esteramide) and the poly(arylene sulfide) components thereof, of a mixture of said liquid crystalline poly(esteramide) and said liquid crystalline polyester, and up to about 300 parts by weight, based on the total weight of the composition, of said solid filler.

16. The filled polymeric composition recited in claim 15, wherein said liquid crystalline poly(esteramide) comprises about 1% to about 30% by weight of said mixture of said liquid crystalline polyester and said liquid crystalline poly(esteramide).

17. The filled polymeric composition recited in claim 14, wherein said liquid crystalline polyester comprises monomer units derived from 6-hydroxy-2-naphthoic acid and 4-hydroxybenzoic acid, said liquid crystalline poly(esteramide) comprises monomer units derived from 6-hydroxy-2-naphthoic acid, terephthalic acid and 4-aminophenol, said poly(arylene sulfide) is poly(phenylene sulfide), and said solid filler is glass fiber.

* * * * *

UNITED STATES PATENT AND TRADEMARK OFFICE
CERTIFICATE OF CORRECTION

PATENT NO. : 5,418,281
DATED : May 23, 1995
INVENTOR(S) : Yung et al.

It is certified that error appears in the above-indentified patent and that said Letters Patent is hereby corrected as shown below:

Column 3, line 7, "end-tapping" should be -- end-capping --.

Claim 3, column 10, line 16, after "at least" add -- about 10% compared to an otherwise identical composition having an equal amount of liquid crystal polymer, all of which is present as the liquid crystalline polyester. --

Claim 11, column 11, line 19, "se$^{-1}$" should be -- sec$^{-1}$ --.

Signed and Sealed this

Thirteenth Day of May, 1997

Attest:

BRUCE LEHMAN

Attesting Officer

Commissioner of Patents and Trademarks